(12) United States Patent
Rosen et al.

(10) Patent No.: US 10,963,517 B2
(45) Date of Patent: Mar. 30, 2021

(54) GRAPHICAL USER INTERFACE FOR DISPLAYING SEARCH ENGINE RESULTS

(71) Applicant: Kensho Technologies, LLC, Cambridge, MA (US)

(72) Inventors: Eli Rosen, Cambridge, MA (US); Joseph Ong, Cambridge, MA (US); Luis Carli, Cambridge, MA (US); Leonid Taycher, Newton, MA (US); Adam Broun, Lexington, MA (US)

(73) Assignee: Kensho Technologies, LLC, Cambridge, MA (US)

( * ) Notice: Subject to any disclaimer, the term of this patent is extended or adjusted under 35 U.S.C. 154(b) by 272 days.

(21) Appl. No.: 16/115,815

(22) Filed: Aug. 29, 2018

(65) Prior Publication Data

US 2019/0057165 A1 Feb. 21, 2019

Related U.S. Application Data

(63) Continuation of application No. PCT/US2017/035074, filed on May 30, 2017, which
(Continued)

(51) Int. Cl.
*G06F 16/9038* (2019.01)
*G06F 16/25* (2019.01)
(Continued)

(52) U.S. Cl.
CPC ........ *G06F 16/9038* (2019.01); *G06F 16/248* (2019.01); *G06F 16/24568* (2019.01); *G06F 16/25* (2019.01)

(58) Field of Classification Search
CPC .... G06F 16/9038; G06F 16/25; G06F 16/248; G06F 16/24568; H04L 41/22
See application file for complete search history.

(56) References Cited

U.S. PATENT DOCUMENTS 6,081,797 A 6/2000 Hittt
8,341,143 B1 12/2012 Karls et al.
(Continued)

OTHER PUBLICATIONS

International Searching Authority, International Search Report and Written Opinion, PCT/US2017/053957, dated Nov. 10, 2017, 16 pages.
(Continued)

*Primary Examiner* — Robert W Beausoliel, Jr.
*Assistant Examiner* — Mohammad Solaiman Bhuyan
(74) *Attorney, Agent, or Firm* — Fish & Richardson P.C.

(57) ABSTRACT

Methods, systems, apparatus, including computer programs encoded on computer storage medium, for generating rendering data. The method includes actions of receiving a stream of real-time data, analyzing the stream of real-time data to detect a set of one or more attributes associated with a real-time event, identifying, based on the one or more attributes, one or more data records representing an event-outcome pair, wherein an outcome in the event-outcome pair includes data identifying a content item, obtaining historical data associated with the content item, and generating rendering data including data for rendering a first layer representing real-time data specifying a current value of the content item as an overlay to a second layer representing the obtained historical data associated with the content item, with each of the rendered layers being juxtaposed to one or more specified portions of the graphical user interface.

15 Claims, 7 Drawing Sheets

Related U.S. Application Data is a continuation-in-part of application No. 15/477,964, filed on Apr. 3, 2017, now Pat. No. 10,726,071.

(60) Provisional application No. 62/454,039, filed on Feb. 2, 2017.

(51) Int. Cl.
*G06F 16/248* (2019.01)
*G06F 16/2455* (2019.01)

(56) References Cited

U.S. PATENT DOCUMENTS

| | | | |
|---|---|---|---|
| 9,411,857 | B1 | 8/2016 | Chechik et al. |
| 9,792,259 | B2 | 10/2017 | Heinz |
| 10,726,071 | B2 | 7/2020 | Taycher et al. |
| 2002/0002520 | A1 | 1/2002 | Gatto |
| 2009/0089108 | A1 | 4/2009 | Angell et al. |
| 2009/0248488 | A1* | 10/2009 | Shah ............... G06Q 10/06375 |
| | | | 705/7.28 |
| 2010/0114954 | A1 | 5/2010 | Sareen et al. |
| 2011/0225289 | A1 | 9/2011 | Prasad et al. |
| 2012/0047445 | A1 | 2/2012 | Rajagopal |
| 2013/0097125 | A1* | 4/2013 | Marvasti ............... G06F 16/90 |
| | | | 707/692 |
| 2013/0191388 | A1 | 7/2013 | Bernhardt et al. |
| 2014/0019398 | A1* | 1/2014 | Engel ..................... G06N 5/02 |
| | | | 706/46 |
| 2014/0207705 | A1 | 7/2014 | Strauss et al. |
| 2015/0127632 | A1 | 5/2015 | Khaitan et al. |
| 2015/0331877 | A1 | 11/2015 | Lou |
| 2015/0379563 | A1 | 12/2015 | Franosch et al. |
| 2016/0098176 | A1 | 4/2016 | Cervelli et al. |
| 2016/0260105 | A1* | 9/2016 | Quilichini ............ G06Q 10/087 |
| 2016/0310850 | A1* | 10/2016 | Covington ............ G06Q 50/34 |
| 2017/0161755 | A1 | 6/2017 | Zhao et al. |
| 2017/0177446 | A1 | 6/2017 | MacLean |
| 2017/0330106 | A1 | 11/2017 | Lindsley |
| 2018/0060733 | A1 | 3/2018 | Beller |
| 2018/0150750 | A1 | 5/2018 | Verdejo et al. |

OTHER PUBLICATIONS

International Searching Authority, International Search Report and Written Opinion, PCT/US2017/035074, dated Oct. 17, 2017, 18 pages.

International Searching Authority, International Search Report and Written Opinion, PCT/US2017/034847, dated Jul. 28, 2017, 15 pages.

* cited by examiner

GRAPHICAL USER INTERFACE FOR DISPLAYING SEARCH ENGINE RESULTS

CROSS-REFERENCE TO RELATED APPLICATIONS

This application claims priority to and is a continuation of International Pat. App. No. PCT/US2017/035074, filed May 30, 2017, which claims priority to and is a continuation-in-part of U.S. applicant Ser. No. 15/477,964, filed Apr. 3, 2017, which claims the benefit of U.S. Provisional Application No. 62/454,039, filed Feb. 2, 2017, the disclosure of which is incorporated herein by reference.

BACKGROUND

This specification related to search engines

A search engine may generally be described as any program that executes a search and retrieves stored data. However, based on the task at hand, a search engine can be configured in a variety of different ways. For example, some search engines may be configured to perform keyword-based search and retrieval. Such search engines may identify relevant search results based, at least in part, on the number of times a search term appears in a particular resource, or the particular resource's metadata. Alternatively, or in addition, some search engines may identify relevant search results by identifying an entity name that is associated with one or more search terms, and then determining the number of occurrences of the entity name in one or more particular resources. In such instances, relevant search results may be obtained based on the number of occurrences of the entity name in the one or more particular resources. The aforementioned ways that a search engine can identify search results responsive to a query are merely exemplary.

A search engine can also be configured to improve a search system by configuring the way that stored data is managed. Stored data can be managed for example by using particular data structures that can improve the operation of a search engine by helping a system identify useful data that they system, or a user of the system, may not otherwise have found and used if not for the particular way in which the underlying data was managed.

SUMMARY

According to one innovative aspect of the present disclosure, a method performed by a data processing apparatus for generating rendering data that when rendered on a display device presents a graphical user interface. The data processing system may include a graphical representation generation system that generates rendering data that when rendered on a display device presents a graphical user interface that displays: a first visual representation representing an event, a second visual representation of a coordinate system comprising (i) a first axis that represents non-linear time intervals, and (ii) a second axis that represents percentages of change in a unit of value for a content item, and multiple layers of data that are each an overlay to one or more portions of the second visual representation of the coordinate system, wherein each layer represents one or more percentages of change in the unit of value of the content item over one or more of the non-linear time intervals in response to the event, wherein the multiple layers of data include at least (i) a first layer representing historical data associated with the content item, and (ii) a second layer representing real-time data specifying a current value of the content item.

Other versions include corresponding systems, apparatus, and computer programs to perform the actions of methods, encoded on computer storage devices.

These and other versions may optionally include one or more of the following features. For instance, in some implementations, the rendering data includes one or more scaling factors, wherein each scaling factor can be used by a display device to scale a particular non-linear time-interval to a particular size.

In some implementations, the scaling factor is a value that is used to determine a width of at least one of the non-linear time intervals.

In some implementations, the first layer representing historical data associated with the content item includes a high historical curve and a low historical curve that define an enclosed area that is indicative of a range of historical values associated with the content item based on an occurrence of the event.

In some implementations, the first layer representing historical data associated with the content item includes a media curve of each of the median historical values associated with the content item based on an occurrence of the event.

According to another innovative aspect of the present disclosure, a method is disclosed that can be performed by a data processing apparatus to juxtapose real-time renderings of layers of data onto one or more specified portions of a graphical user interface. The method may include actions of receiving a stream of real-time data that includes data records, and from time-to-time as the stream of real-time data is received: analyzing the stream of real-time data to detect a set of one or more attributes associated with a real-time event represented by one of the received data records, identifying, based on the one or more attributes, one or more data records representing an event-outcome pair, wherein an outcome in the event-outcome pair includes data identifying a content item, obtaining historical data associated with the content item, and generating rendering data for rendering multiple layers of data in a graphical user interface, including generating rendering data for rendering a first layer representing real-time data specifying a current value of the content item as an overlay to a second layer representing the obtained historical data associated with the content item, with each of the rendered layers being juxtaposed to one or more specified portions of the graphical user interface.

Other versions include corresponding systems, apparatus, and computer programs to perform the actions of methods, encoded on computer storage devices.

These and other versions may optionally include one or more of the following features. For instance, in some implementations, the rendering data includes one or more scaling factors, wherein each scaling factor can be used by a display device to scale a particular non-linear time-interval to a particular size.

In some implementations, the scaling factor is a value that is used to determine a width of at least one of the non-linear time intervals.

In some implementations, the first layer representing historical data associated with the content item includes a high historical curve and a low historical curve that define an enclosed area that is indicative of a range of historical values associated with the content item based on an occurrence of the event.

In some implementations, the first layer representing historical data associated with the content item includes a media curve of each of the median historical values associated with the content item based on an occurrence of the event.

The subject matter of the present disclosure provides multiple advantages over conventional methods. For instance, the present disclosure achieves a prediction of an outcome in response to a detected event in a manner that is faster than conventional methods. The increase in speed is based, at least in part, on the preprocessing of data projections in advance so that the system does not need to traverse every path through the knowledge graph in response to each query. As a result, query results can be provided in near real-time, thereby reducing latency involved predicting an outcome in response to an event.

Other aspects of the subject matter disclosed by this system also contribute to the increase in speed in predicting an outcome in response to a detected event. For example, the knowledge graph is stored in volatile memory thereby making the process run much faster than a system that maintains the knowledge graph on hard disk. In addition, the knowledge graph includes a main stem graph and a plurality of child graphs. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, and thereby increasing the overall performance speed of the disclosed system.

Other aspects of the subject matter disclosed by this specification are directed towards particular graphical user interfaces that improve understanding of data identified by the search engine disclosed by this specification. However, in addition to increasing a user's understanding of the data identified by a search engine, the graphical user interfaces also improve the functioning of one or more computers used to implement the search engine. For example, one or more user interfaces described by the present disclosure use data overlay techniques and juxtaposing of multiple charts, tables, or the like in a novel way that allows data to be displayed in a single user interface, single chart, or the like whereas conventional systems would require multiple interfaces, multiple charts, or the like. This condensing of information from multiple user interfaces, multiple charts, or both, to a single interface, a single chart, or both, reduces the amount of bandwidth required to transmit rendering data for two separate interfaces, two separate charts, or both, from one or more servers to a client device for rendering. In addition, the condensing of information into a single interface, single chart, or both requires less computational resources (e.g., CPU processing, memory usage, battery power, and the like) to be expended by the client device when processing the rendering data to generate such user interfaces because only a single user interface needs to be generated instead of two separate user interfaces. Other efficiencies may also be apparent from use of the technology described by this application.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
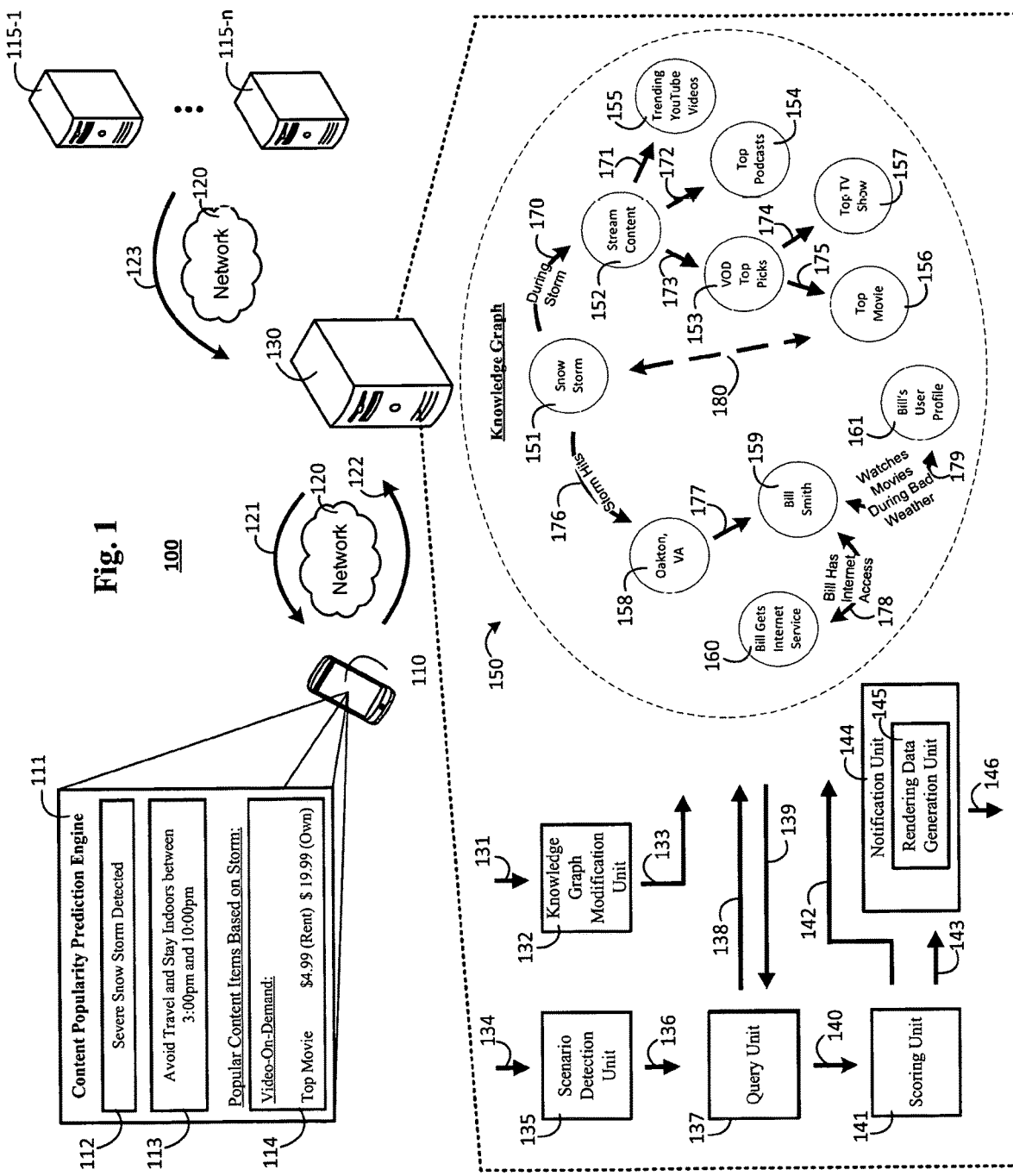
FIG. 1 is a conceptual diagram of an example of a search engine that provides a predicted outcome in response to a detected event.

FIG. 1 is a conceptual diagram of an example of a search engine system 100 that provides a predicted outcome in response to a detected event. The search engine system 100 includes a user device 110, one or more feed servers 115-1 to 115-n, a network 120, and a server 130.

The server 130 includes a knowledge graph modification unit 132, a scenario detection unit 135, a query unit 137, a scoring unit 141, a notification unit 144, and a knowledge graph 150. The server 130 is configured to receive real-time data feeds provided 123 by the one or more feed servers 115-1 to 115-n via the network 120. The network 120 may include, for example, one or more of a LAN, a WAN, a cellular network, the Internet, or a combination thereof. The real-time data feeds may include documents such as news articles, weather reports, financial reports, or the like. The real-time data feeds may include unstructured information, structured information, or a combination thereof. The server 130 may provide 131 the received real-time data feeds to a knowledge graph modification unit 132.

The knowledge graph modification unit 132 is configured to detect an occurrence of one or more entities in a received real-time data feed. An entity may include, e.g., a person, a company, corporation, a government agency, a government official, an asset, an event, a media content item, a country, a city, a state, entity profiles, or the like. Events may include the name (or type) of event and a date of the event. Events may include, for example, storms (e.g., a hurricane, a tornado, a blizzard, a flood, a thunderstorm, a snowstorm, an ice storm, a hail storms, or the like), a terrorist attack, an act of nature (e.g., an earthquake), an environmental disaster (e.g., oil spill), corporate appointments (or resignations), governmental appointments (or resignations), mergers or acquisitions, a product launch, a speech by a government official, an interest rate changes, an asset price movement, an election, tweets from high profile individual, or the like. References to one or more entities may be included within a real-time data record received in a real-time data feed from one or more feed servers 115-1 to 115-n.

The knowledge graph modification unit 132 may process each received real-time data record in a real-time data feed. Processing a received data record by the knowledge graph modification unit 132 may include, for example, processing the real-time data record to identify the occurrence of one or more candidate entity names. Identifying the occurrence of one or more candidate entity names may include, for example, analyzing the text of a real-time data record to detect a string of text that is similar in structure to that of known entity names. In some implementations, the occurrence of context information may also be identified in the real-time data record. Context information may include one or more other words in the real-time data record that may provide information regarding the use of the candidate entity name in the real-time data records.

Analyzing the context related to the use of the candidate entity name in the real-time data record may help server 130 determine, for example, the difference between "Apple" the company and "Apple" the fruit. For example, if an analysis of a real-time data record determines that the real-time data record includes the term "Apple" and the term "iPhone," it is likely that the term "Apple" in the real-time data record is associated with the company Apple. Alternatively, if an analysis of a real-time data record that also includes the term "Apple" includes the term "orchard," then it is likely that the real-time data record is associated with the fruit Apple. Accordingly, analyzing the context in which a candidate entity term is used can help to disambiguate the candidate entity term.

The knowledge graph modification unit 132 may extract one or more features from (i) the identified candidate entity name, (ii) the context information, or (iii) a combination thereof. The one or more features may include data that can be used to numerically represent (i) the identified candidate entity name, (ii) the context information, or (iii) a combination thereof. The knowledge graph modification unit 132 may determine, based on the comparison of (i) the generated feature vector and (ii) one or more disambiguated entity names, whether or not the identified candidate entity is currently maintained by the knowledge graph 150.

The knowledge graph modification unit 132 may update the knowledge graph 150 in response to determining that the candidate entity represented by the generated feature vector is associated with one of the disambiguated entity names in the knowledge graph. For example, in some instances, the knowledge graph modification unit 132 may determine that the feature vector generated for the identified candidate entity is sufficiently similar to an entity of the knowledge graph 150 such as entities 151, 152, 153, 154, 155, 156, 157, 158, 159, 160, 161. For example, a real-time news article may be received that references a trending YouTube video. In such instances, the knowledge graph modification unit may associate the trending YouTube video detected in the real-time data record with the entity 155. In other instances, the knowledge graph modification unit 132 may determine that there are no entities 151, 152, 153, 154, 155, 156, 157, 158, 159, 160, 161 in the knowledge graph 150 that are sufficiently similar to the generated feature vector that represents the candidate entity. In such instances, the knowledge graph modification unit 132 may generate a new entity root node. For example, the knowledge graph modification unit 132 may receive a real-time data record and identify a candidate entity of a hurricane. In such an instance, the knowledge graph modification unit 132 may generate a new entity root node in knowledge graph 150 for a hurricane. Alternatively, the knowledge graph modification unit 132 may generate a new root node "storm" or "weather," and then categorize the "snow storm" and "hurricane" under the new root node (e.g., "storm," "weather," or the like).

The knowledge graph modification unit 132 can add a new entity to the knowledge graph using a template. The template provides an interface between the knowledge graph modification unit 132 and the knowledge graph 150 schema. The template includes a field for each attribute of a particular entity type. For example, a storm entity type may include a field for a type of precipitation, wind speed, expected precipitation, location of storm, and the like. Alternatively, a top movie entity type may include, for example, a title of the movie, the genre of the movie, a popularity rating for the movie, or the like. The server 130 may populate necessary fields that are minimally required for the type of entity being added to the knowledge graph 150. Then, the server 130 may provide the template to the knowledge graph 150. The knowledge graph 150 can generate a new entity node based on the data included in the retrieved template.

Alternatively, or in addition, a template may provide a human to graph interface. For example, a human and the graph may understand a federal reserve meeting as two different things. A template may be used to receive data from a user related to the federal reserve meeting (e.g., start of meeting, end of meeting, tone, interest rate action, etc.). Then, the graph may use this single meeting to generate several events that can be queried independently such as rate action, trend in the federal reserve's tone, etc.). It is the template that facilitates this different understanding of the federal reserve meeting by the user and the graph.

The knowledge graph 150 is a data structure that can be used to store relationships that exist between entities. At a particular point in time t the knowledge graph 150 may be initialized to include (i) an initial set of entities such as entities 151, 152, 153, 154, 155, 156, 157, 158, 159, 160, 161 that are represented in the knowledge graph 150 as a node and (ii) an initial set of known relationships between entities such as relationships 170, 171, 172, 173, 174, 175, 176, 178, 179. Then, beyond time 1, the server 130 may employ one or more algorithms that analyze, from time to time, the data maintained by the knowledge graph 150 in order to discover new relationships between entities that can be inferred based on one or more facts that are either (i) obtained as a real-time data record from one or more servers 115-1 to 115-n via the network 120, or (ii) inferred from the relationships 170, 171, 172, 173, 174, 175, 176, 178, 179 established by the knowledge graph 150.

The knowledge graph 150 shown in FIG. 1 is an example of at least a portion of a knowledge that can be employed by system 100. In some implementations, the knowledge graph 150 may be a child graph of a main stem graph.

For example, the knowledge graph includes a main stem graph and a plurality of child graphs. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, as only a portion of the entire knowledge graph corresponding to a particular childe graph needs to be searched in order to process a search query, thereby increasing the overall performance speed of the disclosed system.

In some implementations, one or more portions of the knowledge graph may be analyzed to determine whether the portion of the knowledge graph is a candidate for being divided to create one or more new child knowledge graphs. Portion of the knowledge graph may be divided to create one or more new knowledge graphs when, e.g., it is determined that a particular one or more users requires access to a particular portion of the knowledge graph and no other users other than the particular one or more users also needs access to the particular portion of the knowledge graph. Alternatively, a new child graph may be created that begins to consume, e.g., receive and store updates and begins its own knowledge graph creation and maintenance operations.

Discovery of a new relationship between two or more entity nodes may occur at some point after time t, which is the time that the knowledge graph 150 was initialized. Discovery of a new relationship between two or more entity nodes may begin with the server 130 obtaining data indicative of one or more facts related to entities in the knowledge graph. In the example of FIG. 1, facts related to entities in the knowledge graph 150 may include, for example, a determination, based on relationship 170, that people stream content during a snow storm. In addition, facts related to the entities in the knowledge graph 150 also include, for example, a determination, based on relationship 176 that a snow storm is hitting (or will hit) Oakton, Va. Similarly, the knowledge graph 150 also establishes facts based on relationships 177, 178, 179, respectively, that Bill Smith lives in Oakton, Va., that Bill Smith has internet access, and that Bill Smith's viewing history indicates that Bill Smith watches movies during bad weather.

The server 130 may analyze the obtained data indicative of facts based on relationships 170, 176, 177, 178, 179 of the knowledge graph 150 to determine whether a relationship between two or more entities can be inferred based on the fact data. In some implementations, analyzing obtained data indicative of facts based on one or more relationships established by the knowledge graph 150 may include, for example, starting at an entity node that is indicative of an event, and analyzing facts related to the event to determine entities effected by the event, capabilities of entities effective by the event, actions historically taken during (or in response to) the event, a combination thereof, or the like.

Based on the analysis of the facts related to the event entity "snow storm," 151, the server 130 can infer a relationship 180 between the event entity "snow storm" 151 and the "top movie" entity 156 that can be used to potentially create an event-outcome pair for "Bill Smith." This relationship 180 can be inferred because the Knowledge Graph knows that during storms 170 users stream content. Furthermore, the storm hits 176 "Oakton, Va.," and "Bill Smith" lives in "Oakton, Va." 177, has "Internet Access" 178, and his usage history 179 shows that he "Watches Movies During Bad Weather."

In some implementations, after discovery of the relationship 180, the server 130 can determine whether to save the discovered relationship as an event-outcome pair. An event-outcome pair may include, for example, and pairing of entities including an event entity and a non-event entity that is a content item that a user such as Bill Smith may be interested in based on the occurrence of the event represented by the event entity. For example, it is snowing in Oakton, so it is likely that Bill Smith will want to purchase the top rated video on demand movie. Before saving the relationship 180 as an event-outcome pair, the server 130 can evaluate relationship 180 to determine whether the event entity (e.g., "snow storm") has historically been associated with triggering the particular non-event entity (e.g., purchase of "top movie" from video on demand). This may include, for example, searching video on demand usage history maintained by the knowledge graph, and determining whether there is a historical relationship between known "snow storms" and increased purchases of a "top movie" from video on demand services. If it is determined that there is a historical relationship between a "snow storm" event 151 and an increase in "top movie" 156 video on demand purchases, the server 130 may store the relationship 180 as an event-outcome pair. An event entity may have historically been associated with triggering the particular non-event entity if the event entity was determined to trigger the particular non-event entity more than a threshold amount of time.

Outcome-pairs may be personally customizable to the extent that a discovered outcome-pair may be stored only for one particular person. Alternatively, a discovered outcome-pair may be stored globally for use by multiple users.

In some implementations, the server 130 can also evaluate existing relationships (e.g., relationships existing at time t, relationships discovered and saved during an update to the knowledge graph 150 at a time later than time t, etc) such as relationship 170. That is, the server 130 can evaluate the relationship 170 to determine whether the event entity (e.g., "snow storm") has historically been associated with triggering the particular non-event entity (e.g., "stream content"). This may include, for example, searching records maintained by the knowledge graph 150 related to internet usage during "snow storm" 151. If it is determined that there still exists a historical relationship between the event entity "snow storm" 151 and the entity "stream content: 152, then the server 130 can leave the relationship 170 unchanged. Alternatively, if it is determined that there is no longer a historical relationship between a "snow storm" 151 and user decisions to "stream content," the server 130 can remove the relationship 170 from the knowledge graph 150. Similar tests regarding the strength of one or more links may be periodically run as new entities are added and removed from the knowledge graph 150 by the knowledge graph modification unit 132.

The example scenario described with respect to the knowledge graph 150 of FIG. 1 relates to an event such as a "snow storm" hitting a town "Oakton, Va.," however the present disclosure need not be so limited. For example, the knowledge graph can be used to predict price movements of one or more financial assets in response to a news event. By way of example, a knowledge graph could include an event entity node of "Flood In Thailand." An examination of the facts established by the knowledge graph that includes an event entity node of a "Flood In Thailand" includes data indicating that material to make magnets is mined in Thailand, that the amount of material mined to make magnets goes down in response to the Thai floods and that the supply of magnets provided to an American Company that makes hard drives is below normal as a result. Based on these facts, a server such as server 130 could infer that the stock price of the American Company will drop based on the "Flood In Thailand." The server 130 could also performing backtesting to determine whether there is a historical relationship between floods in Thailand and the American Company's stock price. If the backtesting confirms that there is a historical relationship between the event entity "Flood In Thailand" and the stock price of the American Company dropping, then the server 130 can store an event-outcome pair identified by the server 130.

The server 130 may employ a scenario detection unit 135. The scenario detection unit 135 may obtain input data 134 that corresponds to a real-time event. Input data 134 corresponding to the real-time event may be obtained, for example, from incoming real-time data records provided by feed servers 115-1 to 115-n or from the knowledge graph 150. The input data 134 may include, for example, a set of one or more attributes associated with a real-time event. One or more attributes associated with a real-time event may include data that describes a particular set of facts associated with an event. For example, the scenario detection unit 135 may receive a real-time data record event that includes attributes such as data indicating that precipitation is expected, that the precipitation type is snow, the event will occur in Oakton, Va., and the predicted accumulation for the storm is 6-12 inches of snow.

Though the use of the scenario detection unit 135 is described with reference to a snow storm, the present disclosure is not so limited. For example, the scenario detection unit 135 may analyze real-time data records or data stored in the knowledge base 150 and identify one or more attributes associated with other types of events identified in real-time data records or data stored in the knowledge base 150. For instance, the scenario detection unit 134 may analyze real-time data records from a news feed and determine that an election was held in the United Kingdom, that the incumbent lost the election, and that a conservative party defeated a liberal party in the election.

The scenario detection unit 135 may provide 136 the one or more attributes to the query unit 137. The query unit 137 may generate a query, based on the one or more attributes received from the scenario detection unit 135, and perform a search 138 of the knowledge graph 150 in order to determine identify a precedent that is consistent with the one or more attributes of the real-time event. For example, with reference to FIG. 1, the generated query may provide a request to the knowledge graph for "content item recommendations during a severe snow storm in Oakton, Va." Alternatively, as a different example with respect to the United Kingdom election, the query unit 137 could generate a query that requests "assets whose price increase when a conservative challenger beats a liberal incumbent in a United Kingdom election."

The knowledge graph 150 may receive the generated query, and process the generated query to determine whether there is one or more precedents in the knowledge graph 150 that satisfy the generated query. A precedent may include, for example, an event-outcome pair. An event-outcome pair may include a rule that has been established showing that when the event of the event-outcome pair occurs that there is a certain probability that the outcome of the event-outcome pair occurs. In the example of FIG. 1, the knowledge graph may return an event-outcome pair based on the newly discovered relationship 180 between the event entity "snow storm" 151 and the "top movie" 156 VOD offering. The event-outcome pair may be returned 139 to the query unit 137.

The processing of the query generated by the query unit 137 can be performed in near real-time without requiring the knowledge graph to be traversed for each query. This is because the server 130 front loads processing of relationships present in the knowledge graph 150 by generating and storing in volatile memory a set of the most common projections that can be generated by querying the knowledge graph 150. This functions to improve the speed with which relevant precedents can be identified by the server 130, thereby reducing latency involved predicting an outcome in response to an event.

The processing of the query generated by the query unit 137 is also made more efficient by the structure of the knowledge graph 150. That is, server 130 may maintain a knowledge graph that includes a main stem graph and a plurality of child graphs such as knowledge graph 150. The main stem graph is configured to receive and maintain general information which can be replicated to each of the child graphs. Each child graph may correspond to data from a particular industry such as healthcare, technology, finance, or the like. Each child graph can then add their own overlays on top of the main stem graph that will not be shared with other child graphs. Accessing the child graphs result in processing cost savings, and thereby increasing the overall performance speed of the disclosed system.

The query unit 137 may provide the received event-outcome pair to the scoring unit 141. The scoring unit 141 may perform one or more tests that evaluate a strength of the relationship identified in the event-outcome pair. In some implementations, the scoring unit 141 may determine whether the event of the event-outcome pair has historically been associated with triggering the outcome of the event-outcome. For example, the scoring unit 141 determines with what probability p that the outcome of the event-outcome pair occurs given the occurrence of the event. If the scoring unit 141 determined that p satisfies a predetermined threshold, then the scoring unit 141 may provide positive feedback to the knowledge graph 150 that strengthens the discovered relationship 180 between the occurrence of the "snow storm" and the purchase or rental of a "top movie" from a video on demand service. For example, the scoring unit 141 may increase the weight associated with the graph edge that represents the discovered relationship between entity 151 and entity 156.

Alternatively, the scoring unit 141 may determine that p does not satisfy a predetermined threshold. In such instances, the scoring unit may provide negative feedback to the knowledge graph 150 that weakens the discovered relationship 180 between the occurrence of the "snow storm" 151 and the purchase or rental of a "top movie" 156 from a video on demand service. For example, the scoring unit 141 may decrease a weight associated with the graph edge that represents the discovered relationship 180 between entity 151 and 156. In such instances the scoring unit 141 may instruct the notification unit 135 to generate an alert to a user device 110 indicating that the system anticipated there should be a relationship between a particular event (e.g., "snow storm") and another entity (e.g., "top movie"), but then determined via testing by the scoring unit 141 that the relationship has not historically existed (e.g., number of occurrences of the "snow storm" triggering purchase of "top movie" do not satisfy a predetermined threshold number of occurrences).

If the scoring unit 141 determines that the event of the event-outcome pair has historically been associated with triggering the outcome in the event-outcome pair, then the scoring unit 141 may transmit 143 data to the notification unit 144 to initiate execution a set of rules. The set of rules may define logic associated with the event-outcome pair that is configured to generate one or more parameter values that specify that the outcome will occur at a time that is subsequent to a time in which real-time data records, on which the request for a precedent was based, was received. By way of example, with reference to FIG. 2, the scoring unit may initiate execution of a set of rules that provide 146 a notification to a user via a user device 110 that the "top movie" will be a popular content item in Oakton, Va. when the snow storm hits.

The notification unit 144 is configured to provide 121 use a rendering data generation unit 145 to generate and transmit rendering data to a user device 110 via a network 120 that can be used to produce user interface 111. By way of example, with reference to FIG. 1, the user interface 111 may include first data 112 that indicates that a severe snow storm has been detected for the location associated with the user device 110. In some implementations, the notification may also include second data 113 that recommends that the user of the user device should avoid travel and stay indoors between 3:00 pm and 10:00 pm, which is the predicted duration of the storm. In addition, the user interface 111 includes third data 114 that is indicative of a content item that is predicted by the system 100 to become popular in response to the snow storm. The notification that includes the third data 114 thus brings to a user's attention a popular content item whose popularity is predicted to spike based on the detection of a particular event (e.g., the snow storm). Once the notification is received, the user of the user device 110 can select to rent or purchase the content item "Top Movie." If the user of the user device 110 initiates the a "rent" or "purchase" transaction, the transaction request can be transmitted 122 to the server 130 (or other server) via the network 120 in order facilitate the requested transaction.

In other implementations, the notification unit 144 can also notify a user device 110 if an expected outcome does not occur in response to a particular event. For example, the system may maintain a portion of a knowledge graph related to sales on one or more products. Based on the facts maintained by the knowledge graph, it may be expected that the sale should trigger an increase in purchases of the sale product. However, the scoring unit 141 may determine that such sales have not historically been found to cause purchases of the sale product to increase. In such instances, the notification unit 144 may notify the user device indicating that the existence of the sale does not mean purchases of the product will increase. That is, the notification unit 144 can notify 146 a user device 110 in an effort to alert a user when an expected outcome is not occurring in response to a particular event.

Figure 4:
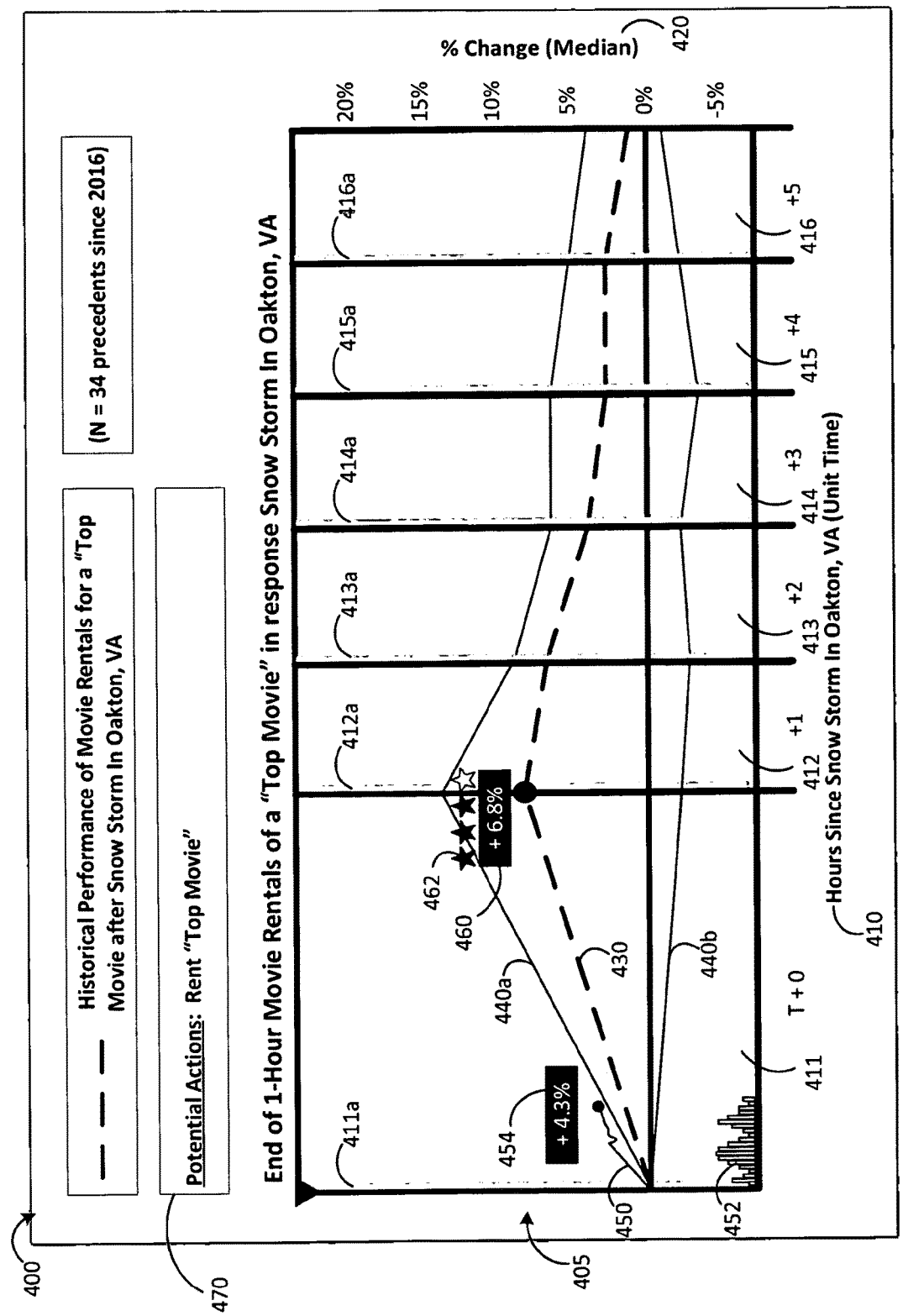
FIG. 4 is an example of a graphical user interface for recommending a content item in response to a detected event.
Figure 6:
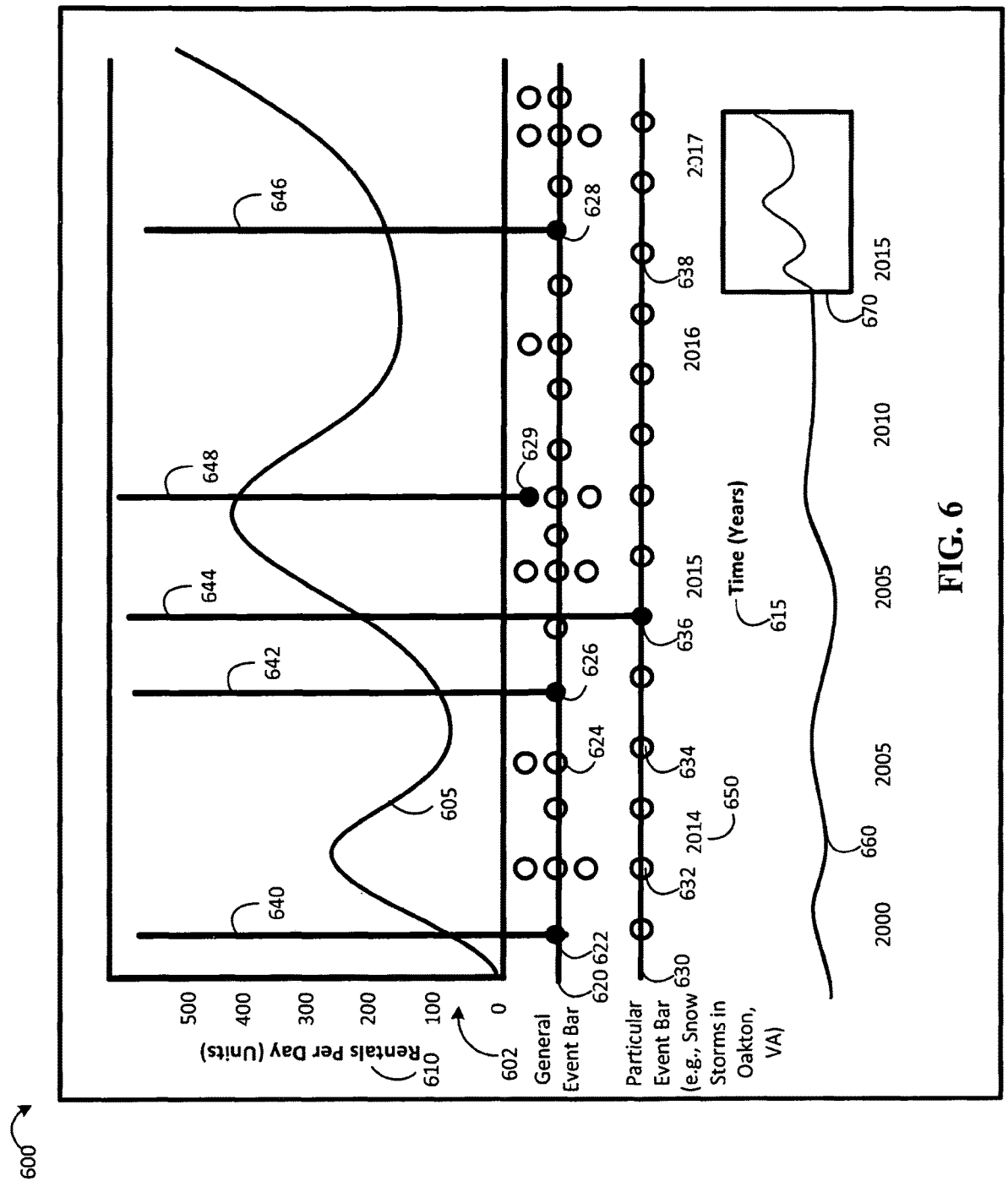
FIG. 6 is an example of a graphical user interface for visually illustrating the impact of detected events.

In yet other implementations, the rendering data generation unit 145 may generate and transmit rendering data to the client device 110 that can be processed and rendered by the client device 145 to generate user interfaces 400 and 600 that include graphical elements shown in FIGS. 4 and 6.

The user device 110 may include, for example, a smartphone, a smartwatch, a tablet, a laptop computer, a desktop computer, or the like.

Aspects of the present disclosure have been described herein with reference to an example about an event entity being a "snow storm" 151 and a triggered outcome being a recommendation of a content item (e.g., "Top Movie" 156) that will become popular because of the "snow storm" (e.g., because more people will be home with the opportunity to watch video on demand movies since a weather service advised people not to travel in the severe snow storm. However, the present disclosure need not be so limited. For example, the system 100 can be used in other implementations to facilitate other types of recommendations. For example, the system 100 can use a knowledge graph similar to the knowledge graph 150 in order to analyze the effect of real world events on assets prices such as stock prices, real estate prices, commodity prices, or the like. For example, the system can perform the same operations described above in order to determine the effect on a company's share price. Other types of events may be analyzed to determine their outcome on a company's asset price such as weather events, changes in corporate governance, mergers and acquisitions, government policy announcements, and the like. Once such event-outcome relationships (e.g., product release makes company stock rise) are identified, the system can then perform backtesting using the scoring unit 141 to determine the strength of the identified event-outcome relationships.

Figure 2:
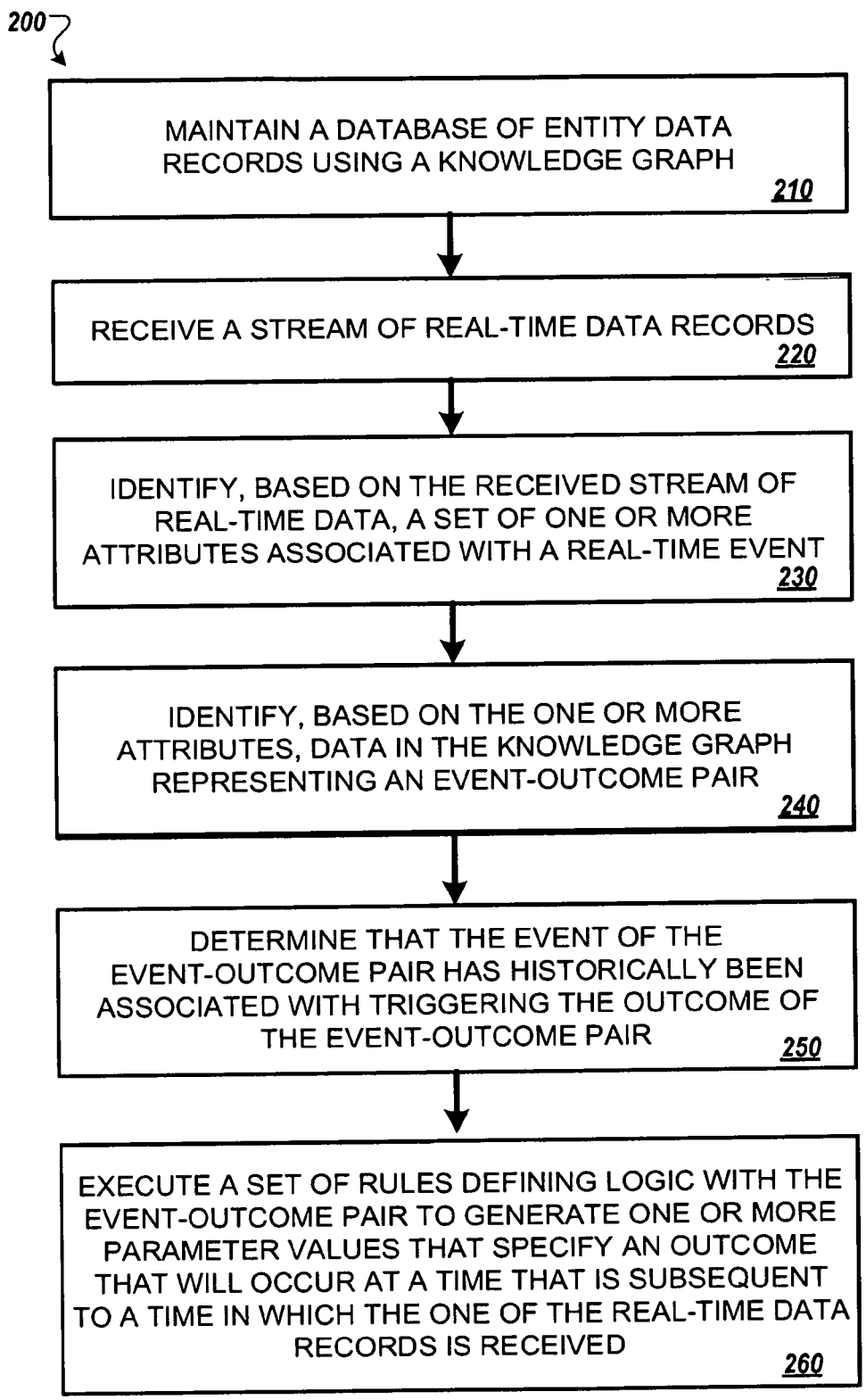
FIG. 2 is a flowchart of a process for providing a predicted outcome in response to a detected event.

FIG. 2 is a flowchart of a process 200 for providing a predicted outcome in response to a detected event. For convenience, the process 200 will described as being performed by a system of one or more computers located in one or more locations. For example, a system such as the system 100 can be appropriately programmed in accordance with this specification to perform the process 200.

A system can begin performance of the process 200 by maintaining 210 a database of entity data records using a knowledge graph. Maintaining a database of entity data records using a knowledge graph may include, for example, storing a database of entity data records and relationships between the entity data records using a knowledge graph. Alternatively, or in addition, maintaining a database of entity data records using a knowledge graph may include creating new relationships between entity data records as the new relationships are discovered and deleting existing relationships between entity data records as the existing relationships are determined to no longer provide a sufficient relationship between entity data records.

The system receives 220 a real-time stream of data records. As the real-time stream of data records is being received, from time to time, the system may perform operations described at stages 230 to 260.

The system identifies 230, based on the stream of real-time data, a set of one or more attributes associated with a real-time event represented by one of the received data records. Identifying a set of one or more attributes associated with a real-time event represented by one or more of the received data records may include analyzing the received real-time stream of data to detect the occurrence of one or more attributes associated with a particular real-time data record in the stream of real-time data. Alternatively, or in addition, the system may identify an event entity stored in the knowledge graph and extract one or more attributes from the stored event entity. The one or more attributes may include, for example, data that describes a particular set of facts associated with an event. For example, for a weather event, attributes may include that the precipitation type is snow, that the snow storm will occur in a particular type of location, or that the predicted accumulation for the storm is 6-12 inches of snow. By way of another example, another event entity could be an election in the United Kingdom. In such an instance, one more attributes associated with the election in the United Kingdom may include, for example that the election was held in the United Kingdom, that the incumbent lost the election, and that a conservative party defeated a liberal party.

The system identifies 240, based on one or more attributes, data in the knowledge graph representing an event-outcome pair. The system may generate a query based on the one or more attributes obtained in stage 230. The generated query can be used to perform a search of the knowledge graph 150 in order to identify a precedent that is consistent with (i) the one or more attributes of the real-time event or (ii) the event entity maintained in the knowledge graph. An example of a query that may generated by the system may include, for example, a query which recites "content item recommendations during severe snow storm in Oakton, Va." By way of another example, the query may recite "assets whose price increase when a conservative challenger beats a liberal incumbent in an election in the United Kingdom."

Identifying, based on the one or more attributes, data in the knowledge graph representing an event-outcome pair may include providing the generated query for execution against the knowledge graph. The generated query may be processed in order to identify one or more precedents maintained by the knowledge graph. A precedent may include, for example, an event-outcome pair. An event-outcome pair may include an established rule that has been established showing that when the event of the event-outcome pair occurs that there is a certain probability that the outcome of the event-outcome pair occurs. The processing of the query can be performed in near real-time without requiring the knowledge graph to be traversed for each query. This is because the server front loads processing of relationships present in the knowledge graph by generating and storing in volatile memory a set of the most common projections that can be generated by querying the knowledge graph. The front loaded processing and storage of the knowledge graph in volatile memory improve the efficiency of the system by, thereby reducing latency involved predicting an outcome in response to an event. The identified precedent may be returned to the query unit in response to search of the knowledge graph.

The system determines 250 whether the event of the event-outcome pair has historically been associated with triggering the outcome of the event-outcome pair. For example, the system may perform one or more tests that evaluate strength of the relationship identified in the event-outcome pair. In some implementations, the system may determine whether the event of the event-outcome pair has historically been associated with triggering the outcome of the event-outcome. In such implementations, the system may determine with what probability p that the outcome of the event-outcome pair occurs given the occurrence of the event. If the system determined that the p satisfies a predetermined threshold, then the system may provide positive feedback to the knowledge graph that strengthens the discovered relationship between the event of the event-outcome pair and the outcome of the event outcome pair. For example, the system may increase the weight associated with the graph edge that represents the discovered relationship between event entity (e.g., "snow storm") 151 of the event-outcome pair and the outcome entity (e.g., "Top Movie" 156) of the event outcome pair.

Alternatively, the system may determine that p does not satisfy a predetermined threshold. In such instances, the system may provide negative feedback to the knowledge graph that weakens the discovered relationship between the occurrence of the event entity (e.g., snow storm" 151) and the purchase or rental of a "top movie" 156 from a video on demand service. For example, the scoring unit 141 may decrease a weight associated with the graph edge that represents the discovered relationship 180 between entity 151 and 156.

If the system determines that the event of the event-outcome pair has historically been associated with triggering the outcome in the event-outcome pair, then the system may initiate execution a set of rules. The set of rules may define logic associated with the event-outcome pair that is configured to generate one or more parameter values that specify that the outcome will occur at a time that is subsequent to a time in which the one of the data records is received. By way of example, with reference to FIG. 1, the system may initiate execution of a set of rules that provide a notification to a user via a user device that recommend the outcome entity of the entity-outcome pair to a user for rental or purchase.

Figure 3:
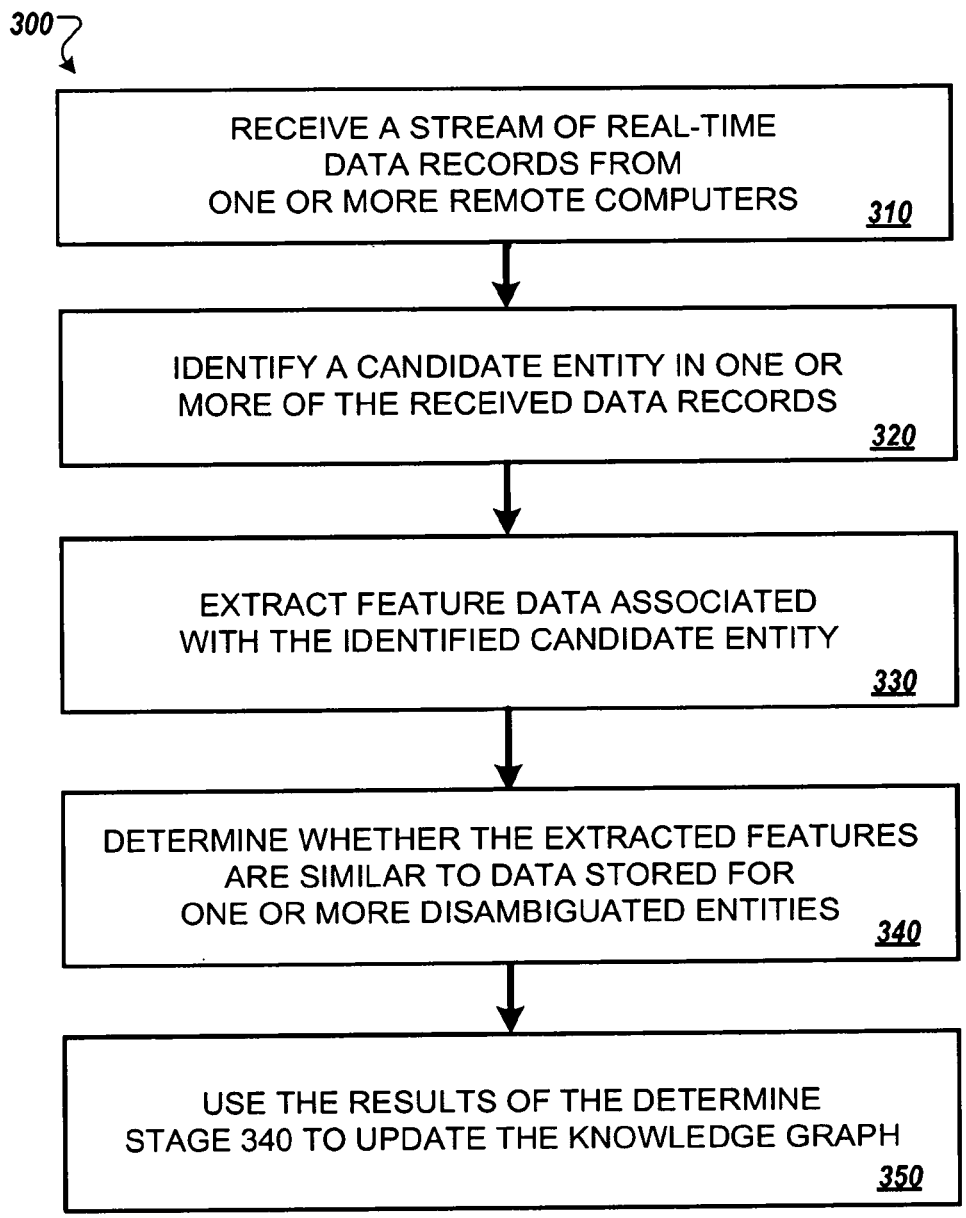
FIG. 3 is a flowchart of a process for detecting an entity in a real-time stream of one or more data records.

FIG. 3 is a flowchart of a process 300 for detecting an entity in a real-time stream of one or more data records. For convenience, the process 300 will be described as being performed by a system of one or more computers located in one or more locations. For example, a system such as the system 100 can be appropriately programmed in accordance with this specification to perform the process 300.

The system may begin to perform the process 300 by receiving 310 a stream of real-time data records from one or more remote computers. The system is configured to detect an occurrence of one or more entities in a received real-time data feed. An entity may include, e.g., a person, a company, corporation, a government agency, a government official, an asset, an event, a media content item, a country, a city, a state, entity profiles, or the like. Events may include the name (or type) of event and a date of the event. Events may include, for example, a storm (e.g., a hurricane, a tornado, a blizzard, a flood, a thunderstorm, a snowstorm, an ice storm, a hail storms, or the like), a terrorist attack, an act of nature (e.g., an earthquake), an environmental disaster (e.g., oil spill), corporate appointments (or resignations), governmental appointments (or resignations), mergers or acquisitions, a product launch, a speech by a government official, an interest rate changes, an asset price movement, an election, tweets from high profile individual, or the like. References to one or more entities may be included within a real-time data record received in a real-time data feed from one or more remote computers.

The system processes the received real-time data record to identify 320 the occurrence of one or more candidate entity names. Identifying the occurrence of one or more candidate entity names may include, for example, analyzing the text of a real-time data record to detect a string of text that is similar in structure to that of known entity names. In some implementations, the system may also identify contextual information that is associated with candidate entity name. Contextual information may include, for example, one or more other words in the real-time data record other than the candidate entity name that can be identified along with the candidate entity name. The contextual information in the real-time data record data record may provide context regarding the use of the candidate entity name in the real-time data records. In some implementations, the contextual information may include other words in the same sentence as the candidate entity name, other words in the same paragraph as the candidate entity name, or the like.

The system extracts 330 feature data associated with the candidate entity. Extracting features associated with the candidate feature entity may include, for example, extracting one or more features from (i) the identified candidate entity name, (ii) the contextual information, or (iii) a combination thereof. The one or more features may include data that can be used to numerically represent (i) the identified candidate entity name, (ii) the contextual information, or (iii) a combination thereof. The extracted features can be used to generate a feature vector that numerically represents the candidate entity name.

The system determines 340, based on the comparison of (i) the generated feature vector and (ii) one or more disambiguated entity names whether an entity corresponding to the candidate entity name is currently maintained by the knowledge graph. This may include, for example, determining the similarity of the generated feature vector to a feature vector generated for each entity node in the set of entity nodes maintained by the knowledge graph. In one implementation, the similarity between the feature vector representing the candidate entity name and each feature vector representing an entity in the knowledge graph may be determined, for example, using a cosine distance function.

The system uses the results of the determining stage at 340 to update the knowledge graph in response to determining that the candidate entity represented by the generated feature vector is associated with a previously identified entity. For example, in some instances, the system may determine that the feature vector generated for the identified candidate entity is sufficiently similar to an entity of the plurality of entities in the knowledge graph. In such an instance, the real-time data record associated with the candidate entity may become associated with the existing entity node. In other instances, the system may determine that there are no entities in the knowledge graph that are sufficiently similar to the generated feature vector that represents the candidate entity. In such instances, the system may generate a new entity root node.

FIG. 4 is an example of a graphical user interface 400 for recommending a content item in response to a detected event.

The user interface 400 may be provided for output in the display of a client device 110. In some implementations, the user interface 400 may occupy the entire display of the client device 110. Alternatively, in other implementations, the user interface 400 may be displayed as an information card in a feed of real-time event items (e.g., new items) in a display of the client device. The user interface 400 includes a particular arrangement of graphical elements that can be used to notify a user of the user device 110 of a recommended content item for purchase in response to a detected event. By way of example, a user interface may be generated that indicates the likely increase in demand for movie rentals (or purchases) of a "Top Movie" in response the particular event of a snow storm in Oakton, Va. However, the present disclosure need not be so limited. Instead, user interfaces may be generated to recommend any kind of content item for purchase, rental, or sale by a user in response to a detected event. Content items may include, for example, movies, books, clothing items, trending internet videos, food supplies, medical supplies, consumer electronics items, financial assets, or the like.

The user interface 400 may include a plurality of graphical elements that are displayed, overlayed, juxtaposed, or the like in an effort to convey a recommendation of a content item in response to a detected event. For example, the graphical elements may include an x-axis 410, one or more columns non-linear time intervals of high significance 411, 412, 413, 414, 415, 416, one or more non-linear time zones of low significance 411a, 412a, 413a, 414a, 415a, 416a, a y-axis 420, a median curve 430, a high historical curve 440a, a low historical curve 440b, an indication of a most relevant historical data point 460, a confidence score 462 indicating a level of confidence in a particular historical data point in the chart 405, a real-time data curve 450, a real-time volume 452, and a real-time change 454 in the real-time data curve from T=0.

Other graphical elements provided for display may include the area between the high historical curve 440a and the low historical curve 440b. This area between the high historical curve 440a and the low historical curve 440b is indicative of the historical data on record for the change in value of the recommended content item associated with the graph 405 in response to the detected event that is associated with the graph 405. In some implementations, the area between the high historical cure 440a and the low historical curve 440b may be graphically highlighted, shaded, or the like. The change in value of the content item described with respect to the user interface 400 may be a change in any quantifiable value such as purchases of a content item, rentals of a content item, a market price for a content item, overall consumer demand for a content item, or the like.

The rendering data generation unit 145 may generate rendering data for each of the aforementioned graphical elements shown in the user interface 400, and then provide the generated rendering data to a user device 110. The user device 110 may process and render the generated rendering data received from the rendering data generation unit 145 in order to generate the user interface 400 for display in the graphical user interface of the user device 110.

In the example of FIG. 4, the median curve 430 graphically depicts the median change in movie rentals for a "Top Movie" content item from a video-on-demand service in response to a the detection of a snow storm in Oakton, Va. The relationship between the snow storm event and increased movie rentals for a "Top Movie" may be discovered using the techniques described with reference to FIGS. 1-3. This media curve 430 may be calculated based on N=34 historical precedents maintained by the server 130. The range of values identified in the chart 405 between the high historical curve 440a and the low historical cure 440b is an aggregation of the scope of known responses of "Top Movie" rentals in response to a snow storm in Oakton, Va. For example, the user interface 400 indicates that the highest change in rentals of a "Top Movie" at the end of a first non-linear time interval of high significance 411 amongst the N=34 known precedents where a snow storm hit Oakton, Va. was approximately a 14% increase. On the other hands, at the end of a first non-linear time interval of high significance 411 the lowest change in rentals of a "Top Movie" was approximately −3%. In this instance, the median change at the end of the first non-linear time interval of high significance 411 was determined to be 6.8%. Given that information, the user interface indicates that the remaining 31 precedents for the rentals of a "Top Movie" in response to a snow storm in Oakton, Va. had a change from T=0 (e.g., the time the storm hits) to the end of the first non-linear time interval of high significance 411 must fall between −3% and 14%. The user interface 400 shows the same information (e.g., high historical curve 440a, media curve 430, low historical curve, and the area between the high historical curve 440a and low historical curve 440b) for each respective non-linear time intervals of the plurality of non-linear time intervals in the user interface 400.

The user interface 400 may also display a graphical element 450 that is indicative of the real-time change in movie rentals of a "Top Movie" since the snow storm in Oakton, Va. began. The real-time change in movie rentals of a "Top Movie" since the snow storm in Oakton, Va. began may be displayed in addition to the historical data related to movie rentals of a "Top Movie" in Oakton, Va. in response to historical snow storms. The displayed historical data may include historical data such as a high historical curve 440a, a low historical curve 440b, an area between the high historical curve 440a and low historical curve 440b, a median curve 430, or the like. The real-time data and the historical data may be displayed in separate (e.g., independent) charts on the user interface 400. Alternatively, or in addition, the real-time data and the historical data may be displayed in the same chart 405 of the same user interface 400 in a manner that juxtaposes the real-time data (e.g., real-time data curve 450, real-time volume 452, real-time change 454) and the historical data (e.g., high historical curve 440a, low historical curve 440b, an area between the high historical curve 440 and low historical curve 440b, an indication of a most relevant historical data point 460, a confidence score 462 indicating a level of confidence in a particular historical data point in the chart 405, or the like. Generally, each respective graphical element described with respect to FIG. 4 may be referred to as a "layer" that can be graphically displayed, compared, contrasted, juxtaposed, or the like with any other graphical element (or "layer") in order to highlight a change in value for a content item in response to a detected event.

In some implementations, the non-linear time intervals of high significance 411, 412, 413, 414, 415, 416, non-linear time intervals of low significance 411a, 412a, 413a, 414a, 415a, 416a, or both, are predefined for a particular type of template. Alternatively, in other implementations, the non-linear time intervals of high significance 411, 412, 413, 414, 415, 416, non-linear time intervals of low significance 411a, 412a, 413a, 414a, 415a, 416a, or both, may be dynamically generated at the time of rendering the user interface 400.

In some implementations, the non-linear time intervals of high significance 411, 412, 413, 414, 415, 416, non-linear time intervals of low significance 411a, 412a, 413a, 414a, 415a, 416a, or both, may be generated based, at least in part, on one or more scaling factors that define the size of each respective non-linear time interval, or a portion thereof. For example, the system may determine, at the time of generation of the rendering data that can be used to generate the user interface 400, that a particular one or more time intervals is of greater significance than one or more of the other time intervals. For example, it may be determined that the first hour, first day, or more immediately following the occurrence of an event is more significant than two or three days following the occurrence of the event. In such instances, for example, the rendering data generation unit 145 can generate (or obtain) rendering data that includes one or more scaling factors. A rendering engine on the client device 110 may use one or more of the received scaling factors to dynamically adjust one or more aspects of the user interface such as the size (e.g., width, height, or the like) of one or more non-linear time intervals. For example, a received scaling factor can be used to create a first non-linear time interval of high significance for the first hour, first day, or the like that is larger in size than a second non-linear time interval of high significance 412. In addition to being used to size each respective non-linear time interval based on significance, the scaling factor (or another different scaling factor) can also be used to scale the user interface 400, generally, to ensure that an appropriate number of non-linear time intervals are displayed in the user interface of the user device.

The time intervals described herein are referred to as non-linear time intervals because two intervals associated with the same period of time (e.g., first hour and second hour, first day and second day, third hour and fifth hour, or the like) may have different sizes based on their importance. For example, the increased rental rate of a "Fop Movie" within the first hour of a snow storm may be much more relevant to a user who is stuck at home during a snow storm than at a later point in time such as the sixth hour time interval that occurs 6 hours after the snow storm started. This is because, for example, the storm may have died down after 6 hours and the roads may have been plowed. Accordingly, the recommendation of renting a movie at 6 hours after the start of the snow storm may be less applicable because the user may be able to leave the house and perform other tasks.

In some instances, one or more non-linear time intervals of low significance 411a, 412a, 413a, 414a, 415a, 416a, may be created within a non-linear time interval of higher significance 411, 412, 413, 414, 415, 416. Such non-linear time intervals of low significance may be created for a variety of reasons. For example, in some instances, there may be a period of uncertainty within a non-linear time interval of high significance that is less important than the remainder of the non-linear time interval. For example, the initial moments at the start of a new time period may result in data fluctuations that are not indicative of the remainder of the non-linear time interval. Alternatively, for example, some portions of a time interval may not be determined to not be relevant at all. For example, for a chart displaying time on the x-axis in units of days and tracking a percentage price change of a financial asset in response to a detected event, the period of each day that is associated with after-hours trading may be determined to be a non-linear time interval of low significance, as such time periods (e.g., after-trading time periods) may not necessarily be indicative of the financial asset's price movement in response to a detected event. Accordingly, such time intervals of such low significance may be substantially minimized so that a content items change in value during such time period is minimized from display on the user interface.

In some implementations, a confidence score 462 indicating a level of confidence in a particular historical data point in the chart 405 may be calculated using one or more statistical metrics. The statistical metrics may include, for example, a statistical significance between attributes of available historical precedents and attributes of the detected event (e.g., is the level of snow fall in the current snow storm in Oakton, Va. comparable to the level of snow fall from one or more of the N=34 known Oakton, Va. snow storm precedents). Other statistical metrics may also be considered such as similarities in magnitude of a historical precedent and a detected event. Based on this statistical analysis of historical precedents and the detected event, the system may determine one or more historical precedents that may be most relevant to a user. In the example of FIG. 4, the server 130 has determined that the historical median data point of a 6.8% increase in rentals of a "Top Movie" is likely to occur in response to the snow storm in Oakton, Va. The statistical likelihood of the occurrence of an actual change in value of the content item that is similar to the historical median was rated by the server 130 as having a confidence score 462 of 3 out of 4 stars. In some implementations, the server 130 may generate rendering data that can be used to accent (e.g., highlight) the most relevant historical data point 460, the confidence score 462, or both and transmit the generated rendering data for display in a user interface of a client device 110. In some implementations, the server 130 may identify multiple historical data points as being relevant, and can generate rendering data for each respective historical data point deemed relevant, the confidence score associated with each respective historical data point, or a combination thereof and transmit the generated rendering data for display in a user interface of a client device 110.

Though the confidence score 462 is expressed using a star rating system based on a four start scale (e.g., four stars being the best rating and zero stars being the worst rating), the present disclosure need not be so limited. Any graphical element can be used to display a confidence score. In some implementations, for example, the confidence may be presented as a numerical value between zero and one, a numerical value between zero and 100, a percentage, or the like.

In some implementations, the server 130 can recommend one or more particular actions to the user based on the confidence score associated with a historical data point. For example, the server 130 may determine to recommend that a user perform a particular action of renting the current "Top Movie" from a video-on-demand service given the high confidence score (e.g., 3 out of 4 stars) associated with the historical increase in movie rentals of a "Top Movie" one hour after a snow storm occurs in Oakton, Va. Alternatively, in other implementations, the server 130 may determine with a 4 out of 4 star confidence score that a detected event is statistically significant to a historical precedent that resulted in a 7.2% increase in a particular financial asset. In such instances, the server 130 may recommend that the user purchase a financial asset. The user interface 400 may include a recommended action display 470 that includes a recommendation from the system to take a particular action. The recommended action display 470 may include easily understandable language about a possible action a user can take. And, in some implementation, the entire contents of the user interface 400 may, in some implementations, be summarized for display in one or more portions of the card such as the top of the card.

In some implementations, the server 130 can determine that a detected event becomes less relevant to the content item over time. For example, the server 130 may determine that the correlation between historical precedents and the current event calculated based on one or more statistical metrics is not as strong as it initially was. For example, maybe the current snow storm stopped snowing after one hour whereas the most relevant historical precedents continued snowing for five hours. In such instances, the server 130 may determine that the historical data is no longer strongly indicative of future movements in the rentals of a "Top Movie." In such instances, the server 130 may generate rendering data that instructs the client device to change the colors of real-time curve 450 from a first color to a second color. The generated rendering data may be transmitted to the user device, processed, and rendered in order to alter the color of the displayed real-time curve 450. The change in color of the real-time curve 450 can be intended to indicate that the historical data provided in the user interface 400 is less statistically reliable to act on. In some implementations, the change of the real-time data from the first color to the second color may occur after the point in time that the real-time curve surpasses the point in time 460 that was identified as the most statistically relevant data point. In some implementations, first color may include any color other than gray (including, e.g., red, green, blue, yellow, purple, orange, pink, or the like) and the second color may be gray.

In some implementations, the user interface 400 may be described as a hybrid chart. This is because the user interface can be generated by juxtaposing multiple graphical elements such as an x-y axis and columns of a table. For example, the chart 405 includes an x-axis in units of time 410 and a y-axis in units of a percentage change 420 that are each overlayed on top of columns of a table. The columns of the table include multiple columns that each are representative of a non-linear time interval such as non-linear time intervals 411, 412, 413, 414, 415, 416. However, instead of displaying rows of data within each column of the table, the user interface of 400 is generated by rendering data that includes a high historical curve 440a, a low historical curve, an area between the high historical curve 440a and the low historical curve 440b, a median curve 430, and a real-time curve 450. Thus, instead of reading data in rows on a column, a user need only glance the user interface 400 and instantly comprehend the trends in real-time change in content value in response to a detected event versus the historical data change in value of the content items in response to the event.

The user interface 400 provides significant improvements in the field. For example, overlaying the x-y axis on top of the table columns provides a format that allows for improved readability and comprehension of data trends by a user. In addition, the overlaying of the x-y axis on top of the table columns improves the efficiency of the overall computing system 100 and particular client device 110 that is used to generate rendering data representative of the user interface 400 and render the user interface 400. For example, overlaying the x-y axis on top of the table columns allows for data typically displayed in two separate interfaces to be displayed in a single user interface 400. This reduces the amount of bandwidth required to transmit rendering data for two separate interfaces from the server 130 to the client 110. In addition, this requires less computational resources (e.g., CPU processing, memory usage, battery power, and the like) to be expended by the client device when processing the rendering data to generate the user interface 400 because only a single user interface 400 needs to be generated instead of two separate user interfaces. Other efficiencies may also be apparent from use of the technology described by this application.

The graphical user interface 400 shown in the example of FIG. 4 is directed towards the display of data related to the change in value of a single content item in response to a detected event. However, the present disclosure need not be so limited. Instead, the graphical user interface 400 can be modified to include an input mechanism that allows a user to switch back and forth between multiple different content items. For example, graphical user interface 400 may include a drop down box that allows a user to select a different content item and view a chart similar to chart 405 showing how the similar content item's value is predicted to behave in response to the event. In the context of FIG. 4, for example, a dropdown box may be provided that includes an option of downloads of a "Top e-book" in response to a snow storm in Oakton, Va. In some implementations, when the content item is a financial asset, the drop down box may include an option to select one or more financial assets of competitors.

Figure 5:
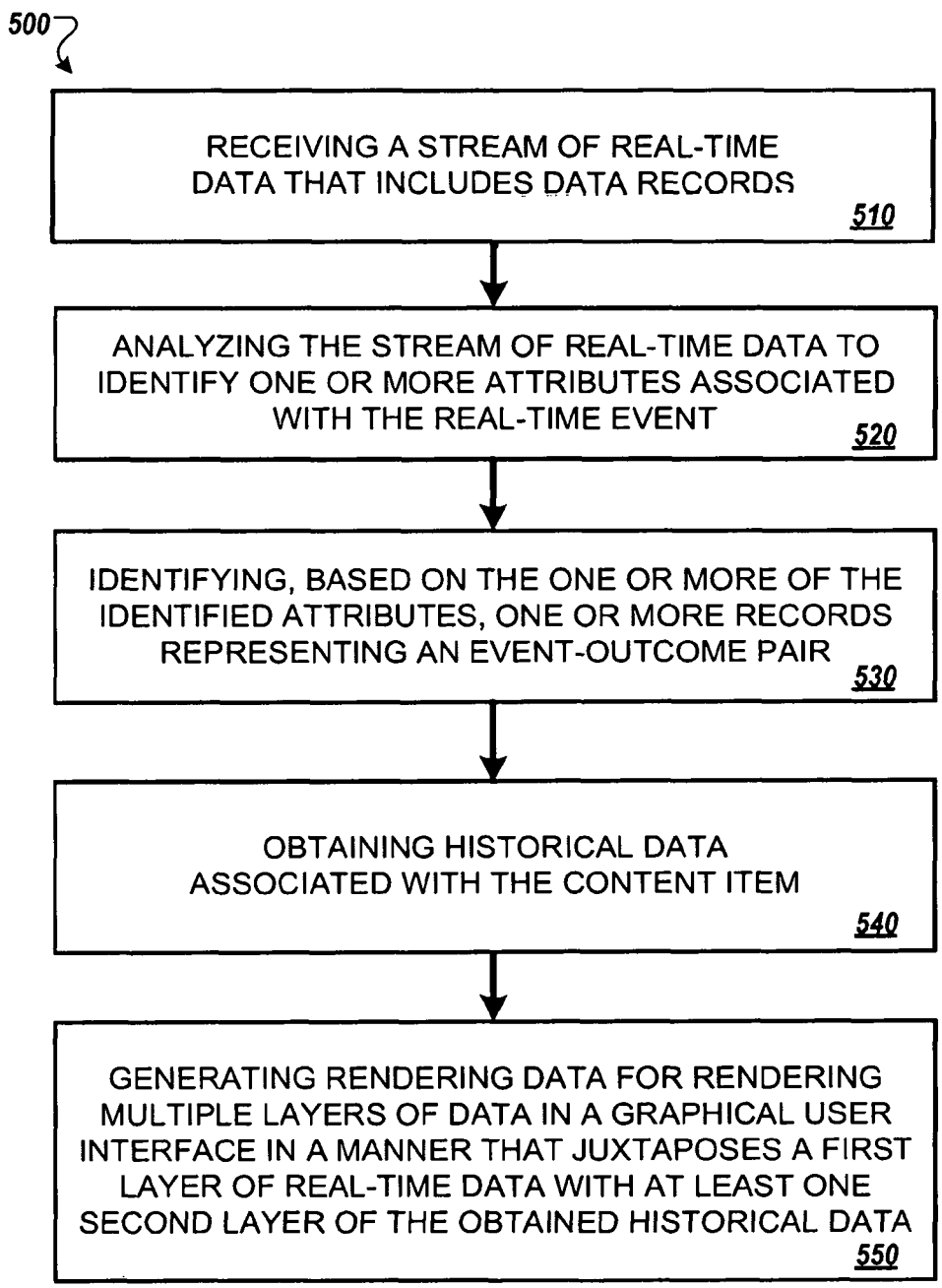
FIG. 5 is a flowchart of a process for generating rendering data that can be rendered to generate the graphical user interface of FIG. 4.

FIG. 5 is a flowchart of a process 500 for generating rendering data that can be rendered to generate the graphical user interface of FIG. 4. Generally, the process 500 may include receiving a stream of real-time data that includes data records (510), analyzing the stream of real-time data to detect one or more attributes associated with the real-time event (520), identifying, based on the one or more attributes, one or more records representing an event-outcome pair (530), obtaining historical data associated with the content item (540), and generating rendering data for rendering multiple layers of data in a graphical user interface in a manner that juxtaposes a first layer of real-time data with a second layer of the obtained historical data (550). For convenience, the process 500 will be described as being performed by a system such as system 100 described with reference to FIG. 1.

In more detail, a system can receive 510 a stream of data that includes real-time data records from one or more remote computers. As the real-time stream of data records is being received, from time to time, the system may perform operations described at stages 520 to 550.

The system can analyze 520 the stream of real-time data to identify one or more attributes associated with the real-time event. The one or more attributes may include, for example, data that describes a particular set of facts associated with an event. For example, for a weather event, attributes may include that the precipitation type is snow, that the snow storm will occur in a particular type of location, that the predicted accumulation for the storm is 6-12 inches of snow, or the like. By way of another example, another event entity could be an election in the United Kingdom. In such an instance, one more attributes associated with the election in the United Kingdom may include, for example that the election was held in the United Kingdom, that the incumbent lost the election, and that a conservative party defeated a liberal party.

The system can identify 530, based on one or more of the identified attributes, one or more records representing an event-outcome pair. For example, the system may generate a query based on the one or more identified attributes obtained at stage 520. The generated query can be used to perform a search of a knowledge graph such as knowledge graph 150 in order to identify a precedent that is consistent with (i) the one or more attributes of the real-time event or (ii) the event entity maintained in the knowledge graph. An example of a query that may be generated by the system may include, for example, a query which recites "content item recommendations during severe snow storm in Oakton, Va." By way of another example, the query may recite "assets whose price increase when a conservative challenger beats a liberal incumbent in an election in the United Kingdom." The system may identify a particular event-outcome pair based on the generated query. For example, the system may identify a particular event-outcome pair such as "rentals/purchases of a "Top Movie" on video-on-demand increase in response to a snow storm detected in Oakton, Va." By way of another example, the system may also identify a particular financial asset whose price increases in response to conservative challenger beating a liberal incumbent in an election in the United Kingdom.

The system can obtain 540 historical data associated with the content item. For example, the system may obtain historical data that is associated with the occurrence of a precedential event-outcome pair. For example, the system may determine the number of rentals/purchases of a particular type of content (e.g., a "Top Movie") that occurred in response to each instance of a snow storm in Oakton, Va. known to the historical record. Alternatively, for example, the system may also determine how a particular asset's price behaved each time a conservative challenger beats a liberal incumbent in an election in the United Kingdom.

The system can obtain 550 a real-time data feed associated with the content item. The real-time data feed associated with the content item may include a stream of real-time data that indicates the change in value for the content item in response to the detected real-time event. For example, the system may obtain a real-time count as to the number of "Top Movie" rentals/purchases that have occurred since a snow storm began in Oakton, Va. Alternatively, for example, the system may obtain a real-time stock ticker for a particular financial asset that shows the stocks's price change in real-time since a conservative challenger defeated a liberal incumbent.

The system can generate 550 rendering data for rendering multiple layers of data in a graphical user interface in a manner that juxtaposes a first layer of real-time data with at least one second layer of the obtained historical data. The rendering data may include a first set of rendering data that can be used to render a first layer of real-time data. The first set of rendering data may include data that can be transmitted to a client device and used by the client device to render a real-time stream of data indicative of the change in value for a content item in response to a detected event. The rendering data may also include one or more second sets of rendering data that can be used to render a second layer of historical data. The one or more second sets of rendering data can be transmitted to a client device and used by the client device to render historical data indicative of the historical change in value for a content item from the occurrence of the event. The historical change in value for the content item in response to a detected event may include, for example, data indicative of a high historical data curve, a low historical data curve, an area between the high historical data curve and a low historical data curve, a median historical data curve, or the like.

The rendering data also includes positional rendering data that can be transmitted to and processed by the client device to determine a placement of graphical elements generated by the client device in response to the client device processing the first set of rendering data and the one or more second sets of rendering data. For example, the positional rendering data may include data that instructs the client device to display the real-time data the historical data side-by-side in independent charts. Alternatively, the positional rendering data may include data that instructs the client device to juxtapose the real-time data on top of the historical data, or vice versa. In some implementations the positional rendering data may also include one or more scaling factors that can be applied to aspects of the first set of rendering data, the one or more second sets of rendering data, or both, in an effort to effect the proportional display of each respective graphical element generated based on the first set of rendering data and the one or more second sets of rendering data.

FIG. 6 is an example of a graphical user interface 600 for visually illustrating the impact of detected events.

The user interface 600 may be provided for output in the display of a client device 110. In some implementations, the user interface 600 may occupy the entire display of the client device 110. The user interface 600 includes a particular arrangement of graphical elements that can be used by a user of the user device 110 to analyze a change in value of a content item in response to historical events. The user interface 600 may allow a user to interact with one or more events in a set of general events 620, one or more events in a set of particular events 630, and then analyze the impact (or response) that the event had on the value of the content item. A user of a client device may interact with the user interface 600 by selecting, deselecting, or the like one or more different events and learn how the value of the content item may change in response to similar events in the future.

The user interface 600 may include a plurality of graphical elements that are displayed, overlayed, juxtaposed, or the like in an effort to allow a user to efficiently investigate the impact of one or more events on the value of a content item. For example, the graphical elements may include a chart 602, a content item value curve 605, a y-axis 610, an x-axis 615, general events bar 620 that includes an event icon 622, 624, 626, 628, 629 representing each event associated with the content item for a particular time period (e.g., snow storms in Oakton, Va., hail storms in Oakton, Va., sunny days in Oakton, Va., or the like), a particular events bar 630 that includes an event icon 632, 634, 636, 638 representing respective occurrences of the same events at different time periods (e.g., snow storms in Oakton, Va. only), an extended timeline 660, and a time period selection window 670. In addition, in response to a user selection of a particular event icon such as event icons 622, 626, 628, 629, 636 graphical elements such markers 640, 642, 644, 646, 648 may be generated for display on the user interface 600. The rendering data generation unit 145 may generate rendering data for each of the graphical elements shown in the user interface 600, and then provide the generated rendering data to a user device 110. The user device 110 may process and render the generated rendering data received from the rendering data generation unit 145 in order to generate the user interface 600 for display in the graphical user interface of the user device 110.

Each respective event icon 622, 624, 626, 628, 629 and 632, 634, 636, 638 is rendered in a particular location of the general events bar 620 and the particular events bar 630 based on the time stamp associated with the event. As a result, a particular location of the content item value curve 650 and the occurrence of a particular event associated with an event icon 622, 624, 626, 628, 629 and 632, 634, 636, 638 can be synced based on time.

A user may interact with the interface 600 by selecting an icon corresponding to an event from either the general events bar 620 or the particular events bar 630. In some implementations, an event icon that has been selected such as an event icon 626 may be visually altered from an event icon such as event icon 624 that has not been selected. By way of example, with reference to FIG. 4, event icons that have been selected are represented by circles that have their centers filled-in, shaded, or the like. Alternatively, with reference to the example of FIG. 4, event icons that have not been selected are represented by circles that do not have their centers filled-in, shaded, or the like. In response to the selection of an event icon such as an event icon 626, the user interface may render a marker 642 that identifies the location on the content item value curve 605 that corresponds to the time when the event associated with the selected event icon 626 occurred. A user can then determine, based on the content item value curve 605 how the value of the content item varied before and after the event associated with the event icon 626. In this example, the "value" of the content item includes the number of times a movie was rented/purchased. However, the present disclosure need not be so limited. For example, the "value" of a content item a may also be a market price for a financial asset.

In the example of FIG. 6, the content item value curve 605, general event icons populating the general events bar 620, and particular event icons populating the particular events bar 630 displayed in the user interface 600 are shown with reference to a time period ranging from the year 2014 to the year 2017. This portion of the content item value curve 605 and respective sets of general events populating the general events bar 230 and the popular events populating the popular events bar are displayed in the chart 602 based on the position of a time period selection window 670. The time period selection window 670 may be user selectable and may be configured to move along the extended timeline 660. The portion of the content item value curve 605 displayed in the chart 602, the general events used to populate the general events bar 620, and the particular events used to populate the particular events bar 630 may be dynamically updated based on the resting location of the time period selection window 670. That is, since the general events and particular events are time-synced to the content item value curve 605, only general events and particular events associated with the time period identified by the time period selection window 670 will be obtained for display in the general event bar 620 and the particular event bar, respectively.

The user interface 600 provides significant improvements in the field. For example, the spatial positioning of the chart 602, general events bar 620, and the particular events bar 630 provides a format that allows for improved readability and comprehension of data trends by a user. In addition, the graphical user interface 600 provides significant improvements to a computer. For example, the information provided in the user interface 600 (e.g., content item value curve 605, general events organized into the general events bar 620, particular events organized into the particular events bar 630) may typically require the use of multiple user interfaces, multiple research tools, or the like. Instead, graphical user interface 600 condenses these features that would conventionally be shown in more than one user interfaces, more than one research tools, or the like in a novel way for display, and interaction with, via a single user interface. This condensing of information from multiple user interfaces, multiple research tools, or both, reduces the amount of bandwidth required to transmit rendering data for two or more separate interfaces from one or more servers to a client device 110 for rendering. In addition, the condensing of information into a single interface, single chart, a single research tool, a combination thereof, or the like requires less computational resources (e.g., CPU processing, memory usage, battery power, and the like) to be expended by the client device when processing the rendering data to generate the such user interfaces because only a single user interface needs to be generated instead of two or more separate user interfaces. Other efficiencies may also be apparent from use of the technology described by this application.

Figure 7:
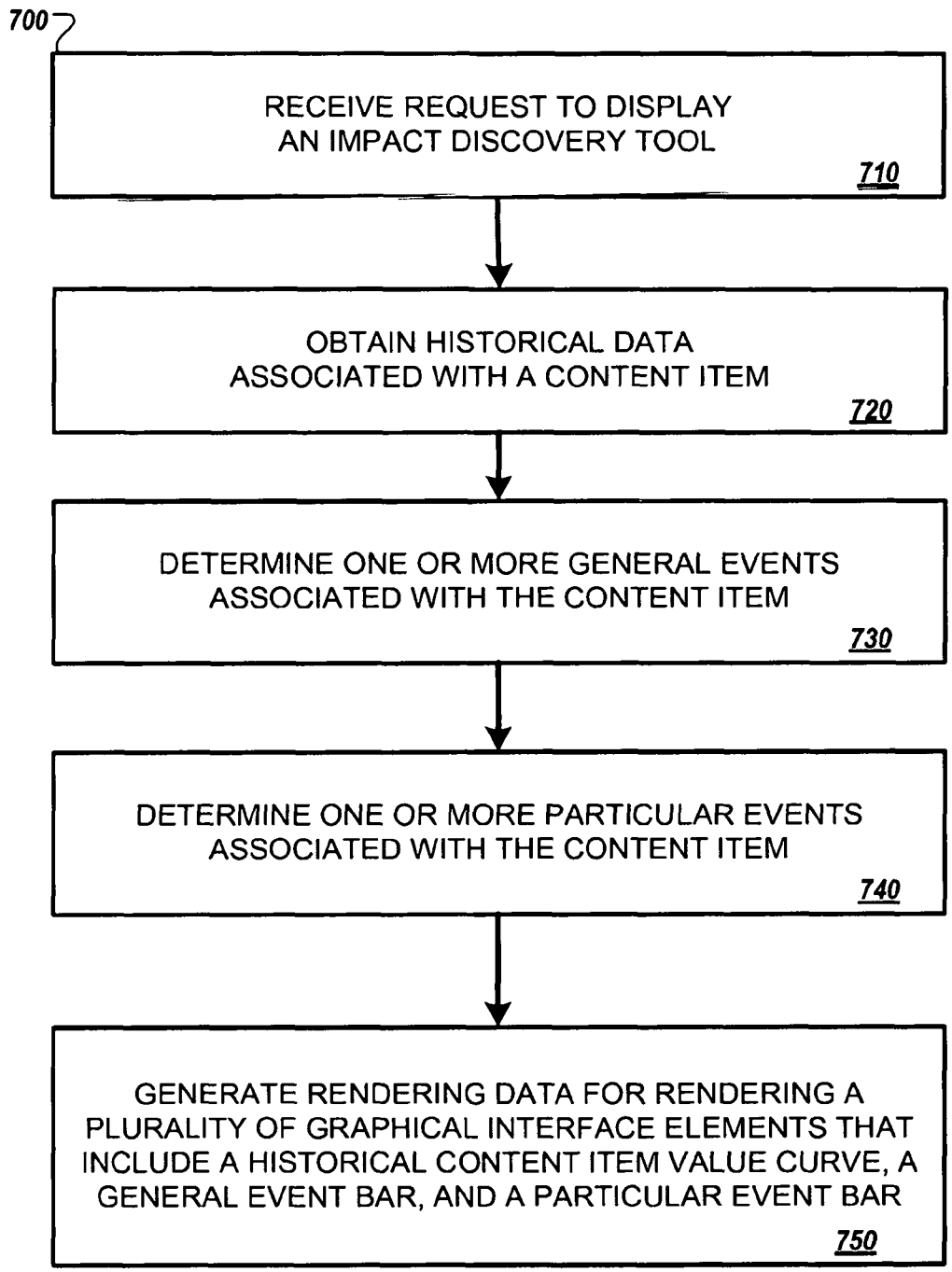
FIG. 7 is a flowchart of a process for generating rendering data that can be rendered to generate the graphical user interface of FIG. 6.

FIG. 7 is a flowchart of a process 700 for generating rendering data that can be rendered to generate the graphical user interface of FIG. 6. Generally, the process 700 includes receiving a request to display an impact discovery tool (710), obtaining historical value data associated with a content item (720), determining one or more general events that are associated with the content item (730), determining one or more particular events associated with the content item (740), and generating rendering data for rendering a plurality of graphical interface elements that include a historical content item value curve, a general event bar, and a particular event bar (750). For convenience, the process 700 will be described below as being performed by a system such as system 100.

In more detail, a system can receive 710 a request to display an impact discovery tool. A request to display an impact discovery tool may include the input of one or more parameters including a content item, a particular event type associated with the content item, a combination thereof, or the like. Content items may include, for example, movies, books, clothing items, trending internet videos, food supplies, medical supplies, consumer electronics items, financial assets, or the like. Particular event types may include, for example, rental numbers for the content item, sales numbers for the content item, product release announcements for the company that makes the content item, product release announcements for a competitor of the maker of the content item, earnings announcements, weather events, political events, social media events, corporate mergers, changes in company leadership, or the like.

The system can obtain 720 historical value data associated with a content item. For example, the system can generate a query and perform a search of one or more historical databases to obtain historical value information for the content item identified at stage 710. Historical value information may include a rental history of a content item, a sales history for a content item, pricing history for a content item, or the like.

The system can determine 730 one or more general events that are associated with the content item. Determining one or more general events that are associated with a content item may include identifying each event that is known to be associated with the content item received at stage 710. Determining one or more general events may include generating a query that includes the content item received at stage 710, searching an event database, and retrieving event data identifying a content item. Event data may include, for example, an event date, an event time, or a combination thereof, for each event that is associated with the content item. The retrieved event data may be used to generate rendering data that will be used to position one or more event icons on a general event bar, time-sync the event with a content item value curve, or a combination thereof.

The system can determine 740 one or more particular events associated with the content item. In some implementations, the one or more particular events associated with the content item may be based on a particular event type parameter received at stage 710. Alternatively, if a user did not provide at least one particular event type, then the system may obtain a set of events related to a default particular event type. A default particular event type may include an event type from the set of event types including for example, rental numbers for the content item, sales numbers for the content item, product release announcements for the company that makes the content item, product release announcements for a competitor of the maker of the content item, earnings announcements, weather events, political events, social media events, corporate mergers, changes in company leadership, or the like. In some implementations, selecting a default particular event type may be based on the type of content item being searched. For example, if a content item such as a book, a movie, or the like is input, then the default particular event type may include sales figures for the book, movie, or the like. Alternatively, for example, if the content item is a financial asset, then the default particular event type may include, for example, earnings announcements. Determining one or more particular event types may include generating a query and retrieving event data that includes an event identifier, an event date, an event time, or a combination thereof, for each instance of the event that is associated with the content item. The retrieved event data may be used to generate rendering data that will be used to position one or more event icons on a particular event bar, time-sync the event with a content item value curve, or a combination thereof. For instances where multiple particular event types are received at stage 710, the system may generate rendering data capable of being processed by a client device to render a particular event bar for each particular event type.

The system can generate 750 rendering data for rendering a plurality of graphical interface elements that include a historical content item value curve, a general event bar, and a particular event bar. The rendering data may include a first set of rendering data that can be used to render a first portion of the interface. The first set of rendering data may include data that can be transmitted to a client device and used by the client device to render graphical elements in the form of a historical content item value curve. The rendering data may also include a second set of rendering data that can be transmitted to the client device and used by the client device to render a graphical element in the form of a general event bar including one or more event icons. The general event bar may include, for example, a horizontal bar of event icons of different types that are each associated with the content item and a particular event time. In some implementation, the second set of rendering data may include time data for each general event that can be used to time-sync each general event icon to the content item value curve. The rendering data may also include one or more third sets of rendering data that can be transmitted to the client device and used by the client device to render graphical elements in the form of respective particular event bars. A particular event bar may include, for example, a horizontal bar of event icons of a single type that are each associated with the content item and a particular event time. In some implementation, the third set of rendering data may include time data for each particular event that can be used to time-sync each particular event icon to the content item value curve.

The rendering data also include positional rendering data that can transmitted to and processed by the client device to determine a placement of graphical elements generated by the client device in response to the client device processing the first set of rendering, the second set of rendering data, and one or more third sets of rendering data. For example, the positional rendering data may include data that instructs the client device to display the historical content value curve above the general events bar and the general events bar above each of the one or more respective particular events bar. Furthering aforementioned example, the positional rendering data may also include data that can instruct the client device as to the particular order of each respective particular events bars in those instances where there are multiple positional events bars. In some implementations the positional rendering data may also include one or more scaling factors that can be applied to aspects of the first set of rendering data, the second set of rendering data, the one or more third sets of rendering data, or a combination thereof, in an effort to effect the proportional display of each respective graphical element generated based on the first set of rendering data, the second set of rendering data, and the one or more third sets of rendering data.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a tablet, a smartwatch, a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor, LED (light emitting diode) monitor, OLED (organic light emitting diode), for displaying information to the user and a keyboard and a pointing device, e.g., a mouse, trackball, or touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method performed by a data processing apparatus for juxtaposing real-time renderings of layers of data onto one or more specified portions of a graphical user interface, the method comprising:

receiving a stream of real-time data that includes data records; and from time-to-time as the stream of real-time data is received:

automatically analyzing the stream of real-time data to detect a set of one or more attributes associated with a current real-time event represented by one of the received data records;

identifying, based on the one or more attributes, one or more data records representing an event-outcome pair, wherein an outcome in the event-outcome pair includes data identifying a content item;

obtaining historical data associated with the content item; and generating rendering data for rendering multiple layers of data in the graphical user interface showing a common timeline, including generating rendering data for rendering a first layer representing real-time data specifying a current value of the content item as an overlay to a second layer representing the obtained historical data associated with the content item showing the historical variation of content item data over time after the occurrence of real-time events that are precedents to the current real-time event, the historical variation of content item data over time being based on data recorded after prior occurrences of real-time events that are precedents to the current real-time event, wherein overlaying of the first layer and the second layer provides at least one prediction regarding the content item.

2. The method of claim 1, wherein the rendering data includes one or more scaling factors, wherein each scaling factor can be used by a display device to scale a particular non-linear time-interval to a particular size.

3. The method of claim 2, wherein the scaling factor is a value that is used to determine a width of at least one of the non-linear time intervals.

4. The method of claim 1, wherein the first layer representing historical data associated with the content item includes a high historical curve and a low historical curve that define an enclosed area that is indicative of a range of historical values associated with the content item based on an occurrence of the event.

5. The method of claim 1, wherein the first layer representing historical data associated with the content item includes a media curve of each of the median historical values associated with the content item based on an occurrence of the event.

6. A system for juxtaposing real-time renderings of layers of data onto one or more specified portions of a graphical user interface comprising:

one or more computers and one or more storage devices storing instructions that are operable, when executed by the one or more computers, to cause the one or more computers to perform operations comprising:

receiving a stream of real-time data that includes data records; and from time-to-time as the stream of real-time data is received:

automatically analyzing the stream of real-time data to detect a set of one or more attributes associated with a current real-time event represented by one of the received data records;

identifying, based on the one or more attributes, one or more data records representing an event-outcome pair, wherein an outcome in the event-outcome pair includes data identifying a content item;

obtaining historical data associated with the content item; and generating rendering data for rendering multiple layers of data in the graphical user interface showing a common timeline, including generating rendering data for rendering a first layer representing real-time data specifying a current value of the content item as an overlay to a second layer representing the obtained historical data associated with the content item showing the historical variation of content item data over time after the occurrence of real-time events that are precedents to the current real-time event, the historical variation of content item data over time being based on data recorded after prior occurrences of real-time events that are precedents to the current real-time event, wherein overlaying of the first layer and the second layer provides at least one prediction regarding the content item.

7. The system of claim 6, wherein the rendering data includes one or more scaling factors, wherein each scaling factor can be used by a display device to scale a particular non-linear time-interval to a particular size.

8. The system of claim 7, wherein the scaling factor is a value that is used to determine a width of at least one of the non-linear time intervals.

9. The system of claim 6, wherein the first layer representing historical data associated with the content item includes a high historical curve and a low historical curve that define an enclosed area that is indicative of a range of historical values associated with the content item based on an occurrence of the event.

10. The system of claim 6, wherein the first layer representing historical data associated with the content item includes a media curve of each of the median historical values associated with the content item based on an occurrence of the event.

11. A non-transitory computer-readable medium storing software comprising instructions executable by one or more computers which, upon such execution, cause the one or more computers to perform operations for juxtaposing real-time renderings of layers of data onto one or more specified portions of a graphical user interface comprising:

receiving a stream of real-time data that includes data records; and from time-to-time as the stream of real-time data is received:

automatically analyzing the stream of real-time data to detect a set of one or more attributes associated with a current real-time event represented by one of the received data records;

identifying, based on the one or more attributes, one or more data records representing an event-outcome pair, wherein an outcome in the event-outcome pair includes data identifying a content item;

obtaining historical data associated with the content item; and generating rendering data for rendering multiple layers of data in the graphical user interface showing a common timeline, including generating rendering data for rendering a first layer representing real-time data specifying a current value of the content item as an overlay to a second layer representing the obtained historical data associated with the content item showing the historical variation of content item data over time after the occurrence of real-time events that are precedents to the current real-time event, the historical variation of content item data over time being based on data recorded after prior occurrences of real-time events that are precedents to the current real-time event, wherein overlaying of the first layer and the second layer provides at least one prediction regarding the content item.

12. The computer-readable medium of claim 11, wherein the rendering data includes one or more scaling factors, wherein each scaling factor can be used by a display device to scale a particular non-linear time-interval to a particular size.

13. The computer-readable medium of claim 12, wherein the scaling factor is a value that is used to determine a width of at least one of the non-linear time intervals.

14. The computer-readable medium of claim 11, wherein the first layer representing historical data associated with the content item includes a high historical curve and a low historical curve that define an enclosed area that is indicative of a range of historical values associated with the content item based on an occurrence of the event.

15. The computer-readable medium of claim 11, wherein the first layer representing historical data associated with the content item includes a media curve of each of the median historical values associated with the content item based on an occurrence of the event.

* * * * *